Figure 2:
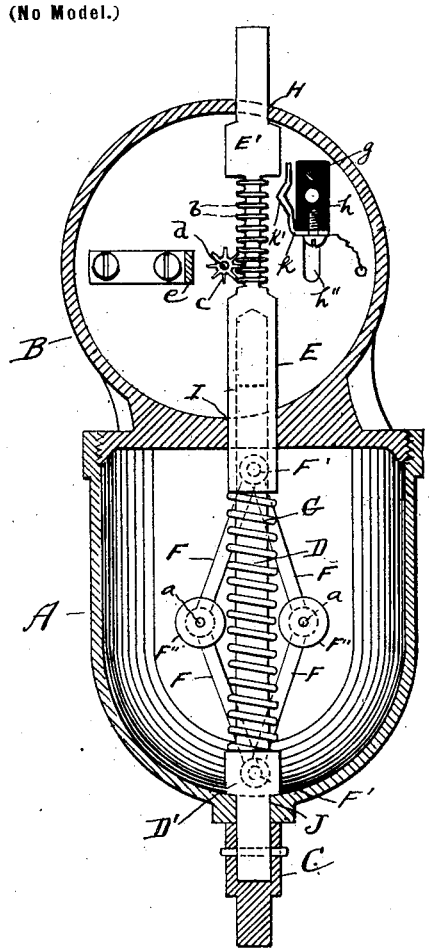

No. 705,514. Patented July 22, 1902.
H. S. CREDLEBAUGH.
SPEED GAGE.
(Application filed July 15, 1901.)
(No Model.) 3 Sheets—Sheet 1.
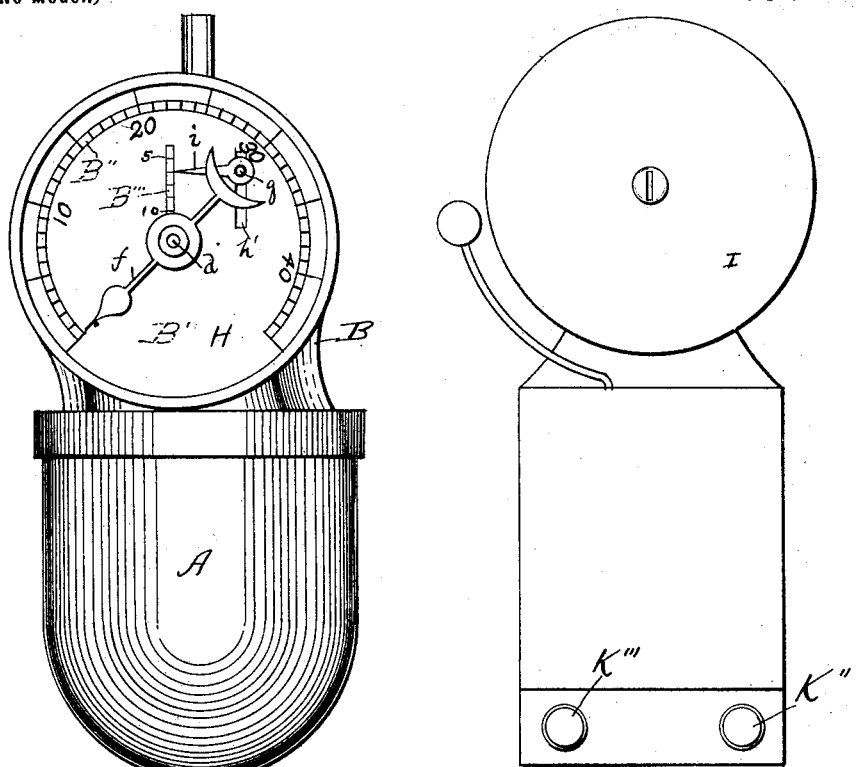
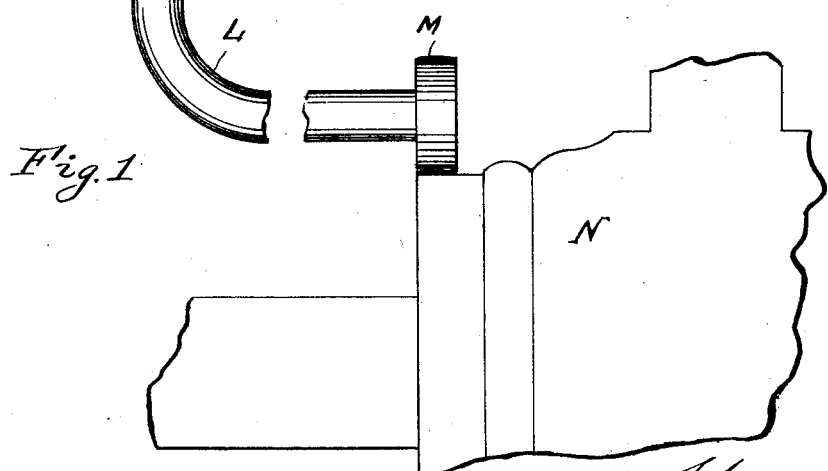
WITNESSES:
M. Siebler
C. M. Theobald.
INVENTOR
H. S. Credlebaugh
BY R. J. McCarty
his ATTORNEY No. 705,514. Patented July 22, 1902.
H. S. CREDLEBAUGH.
SPEED GAGE.
(Application filed July 15, 1901.)
(No Model.) 3 Sheets—Sheet 2.

WITNESSES:
M. Siebler.
C. M. Theobald.

H. S. Credlebaugh,
INVENTOR

BY R. J. McCarty,
his ATTORNEY

No. 705,514. Patented July 22, 1902.
H. S. CREDLEBAUGH.
SPEED GAGE.
(Application filed July 15, 1901.)
(No Model.) 3 Sheets—Sheet 3.
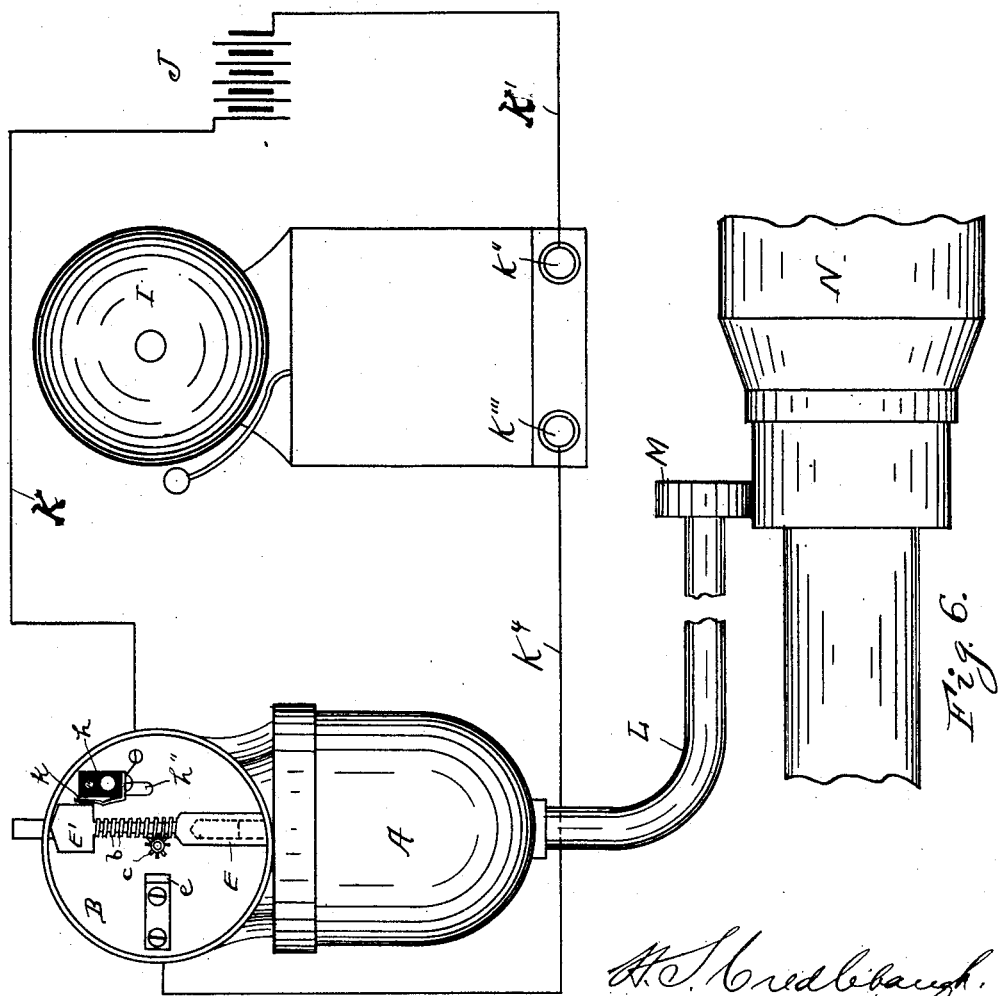

UNITED STATES PATENT OFFICE.

HENRY S. CREDLEBAUGH, OF NEW CARLISLE, OHIO.

SPEED-GAGE.

SPECIFICATION forming part of Letters Patent No. 705,514, dated July 22, 1902.

Application filed July 15, 1901. Serial No. 68,423. (No model.)

*To all whom it may concern:*

Be it known that I, HENRY S. CREDLEBAUGH, a citizen of the United States, residing at New Carlisle, in the county of Clark and State of Ohio, have invented certain new and useful Improvements in Speed-Gages; and I do declare the following to be a full, clear, and exact description of the invention, such as will enable others skilled in the art to which it appertains to make and use the same, reference being had to the accompanying drawings, and to the letters of reference marked thereon, which form a part of this specification.

This invention relates to a speed-gage for visually and audibly ascertaining the speed at which certain vehicles are being driven, such as electric cars, horseless carriages, &c.

The object of the invention is to provide means for ascertaining at any moment the speed at which a vehicle is running, and, further, to provide an alarm-signal which will notify the driver and other persons—for example, the occupants of the car—the moment the speed of the vehicle exceeds a certain limit and to indicate visually the limit of speed at which the alarm-signal sounds.

It is a well-known fact that it is a common custom for municipalities and city governments to have ordinances to regulate the speed at which such vehicles may be run, and it is equally well known that these ordinances are daily violated by street-car companies and others to the great detriment of the general public. Often the speed of vehicles is permitted to exceed the lawful limit, either through the indifference of the driver or his inability to tell at what rate of speed his vehicle is running, and in the case of resulting accident there is no means whatever on the part of the authorities or any one else for proving that the vehicle was being run at an unlawful rate of speed.

It is therefore the object of my invention to provide means for enabling the conductor, motorman, or others to know at any moment the rate of speed and to sound an alarm the very instant the speed of the vehicle is increased beyond that permitted by statute.

Preceding a detailed description of my invention reference is made to the accompanying drawings, of which—

Figure 3:
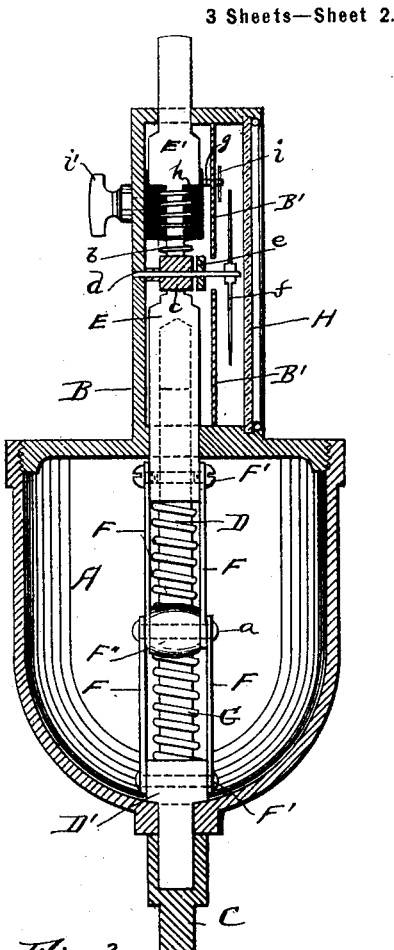
Figure 4:
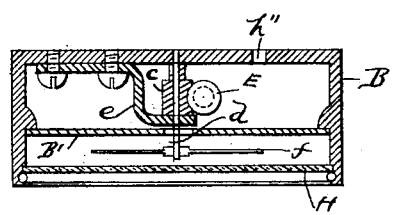

Figure 1 is a front elevation showing my improved speed-gage in position to be operated from the hub of a vehicle—for instance, the hub of a motor-vehicle wheel. Fig. 2 is a vertical sectional elevation of the speed-gage detached. Fig. 3 is a similar view at right angles to Fig. 2. Fig. 4 is a horizontal sectional view through the middle portion of the gage; Fig. 5, an elevation of the electric bell; Fig. 6, a view of the electrical connections.

In the detailed description of my invention similar reference-letters indicate corresponding parts in the several views of the drawings.

A designates a casing, to which an upper casing B is attached by a screw connection or otherwise. The upper casing is preferably circular and is inclosed by a face B', upon which is placed a numerical scale B'', which in the present case indicates speed. There is also another scale B''' on said face, which indicates the speed at which the alarm will be sounded. Inclosed within the casing A is a centrifugal device consisting of a vertical shaft D, which projects through the bottom of said casing and has pinned thereto a coupling C. The shaft D has fixed to its lower portion a hub D', or said hub may be an integral part thereof. E designates a sleeve which fits over the upper ends of said shaft D. The sleeve E and the hub D' are connected through governor-arms F, which are pivoted to said sleeve and hub at F'. The middle portions of said arms, or rather their adjacent ends, are connected to weights F'' by pivot-pins $a$.

G designates an expansion-spring surrounding shaft D and bearing against the hub D' and the sleeve E. The sleeve E has an extended portion which is provided with a series of annular disconnected grooves $b$, above which there is an enlarged contact portion E'. Bearings H I J are provided in the casings A and B for the shaft and the connected sleeve, by which they are maintained in proper alinement.

$c$ designates a center pinion which is fixed to an arbor $d$, having a bearing in a bracket $e$ and in the rear side of the casing B. This pinion is in gear with the annular grooves $b$. The arbor $d$ has fixed to it a hand or pointer $f$, which lies immediately in front of the dial B' and points to the numbers thereon. The dial B' is inclosed by glass plate H.

$g$ designates an arbor which is fixed to a block $h$ of insulation, such as hard rubber or vulcanized fiber. The outer end of said arbor projects through a vertical slot $h'$ in the dial B' and has fixed thereto a hand or pointer $i$, which is movable up and down to point to the indications on scale arranged in the vertical column B''', which, as before stated, indicate the speed at which an alarm is sounded. The block $h$ is attached at its rear side to a thumb-screw $i'$, which passes through a vertical slot $h''$ in the back of casing B' in making connection with said block. It will be seen that the said block may be raised and lowered to the extent of the length of the scale B''' and fixed in position by means of the screw $i'$.

I designates an electric bell which is placed in a suitable position adjacent to the gage, and J is the battery, which may be placed in any suitable place—for example, under the seat of the driver in cases where the device is used on a motor-vehicle. Running from one pole of the battery is a conductor or wire K, which connects with the casing A or B at any point. K' is another conductor or wire, which leads from the other pole of the battery and connects with binding-post $k''$ on the bell. Leading from the other binding-post $k'''$ on said bell is a conductor or wire $k^4$, which connects with contact-spring $k$, which is secured to the insulating-block $h$. This contact-spring, it will be seen from Fig. 2, lies in proximity to the enlarged portion E' of the sleeve E, and said spring has a projecting portion $k'$, with which the enlargement E' makes contact when the sleeve E is lowered by the action of centrifugal force. This contact of the spring $k$ with said portion E' makes the circuit and causes the bell to ring in a well-known manner.

L designates a flexible shaft which is connected to the coupling C, which, as before stated, is connected to the lower end of the centrifugal shaft D. This flexible shaft has suitable bearings (not shown) and is driven from the vehicle axle or hub by means of a friction-wheel M, which is attached thereto, or said friction-wheel may be substituted by a spur-gear. In the present instance I have shown the friction-wheel M in gear with a hub N, which may be the hub of a motor-vehicle. In cases where my device is used in connection with electrical cars the flexible shaft L may be suitably geared to the axle of such vehicle or to any other part which moves in unison with the axle.

The operation of my invention will be comprehended from the foregoing description in connection with the drawings. It will be seen that the centrifugal shaft D, being connected with a rotating part of a vehicle through the flexible shaft L, will receive rotary motion in accordance with the speed at which the vehicle is being driven. This speed when it exceeds a certain definite rate through the effect of centrifugal force overcoming the strength of spring G throws the governor-arms F outwardly, and thus lowers the sleeve E to an extent corresponding with the degree of such force imparted to the shaft D. This movement will be imparted to the pointer $f$, and if the speed should be, for example, at the rate of ten or twenty miles per hour, the pointer will indicate the same on the dial-scale B''.

If the limit of speed permitted under a city ordinance should, for example, be five miles per hour, the alarm device may be set to signal any speed in excess of five miles. For example, the pointer $i$ may be set at the next degree-mark below "5" on the scale B'''. As soon as the speed exceeds five miles per hour the alarm will sound.

While I have described my invention as especially applicable as means for ascertaining and signaling the speeds of vehicles, it is apparent that its uses may be extended. For example, it is available as means for ascertaining the rate of speed at which any rotating body is traveling, such as shafting in machine-shops and other places.

Having described my invention, I claim—

1. In a speed-indicating gage, the combination of a dial having two reading-scales, one of which to indicate the various speeds at which a vehicle is driven, and the other of which to indicate the maximum speed at which such vehicle may be driven, a sleeve geared to the hand of the pointer which indicates the first-named speeds, a rotating shaft driven from a rotating part of a vehicle, centrifugal devices connecting said sleeve and shaft and whereby a rotary and vertically-reciprocating movement is imparted to said sleeve, alarm devices adapted to indicate the maximum speed as indicated on the dial, electrical connections between said alarm devices and said sleeve, a circuit-closer under the control of said sleeve and whereby the said circuit-closer is closed upon an elevation of said sleeve, and the alarm is sounded when the vehicle has attained its maximum or prescribed limit of speed, substantially as and for the purposes specified.

2. In a speed-indicating gage, the combination of a dial having two reading-scales, one of which indicates the various speeds at which a vehicle is driven, and the other of which indicates the maximum speed at which such vehicle may be driven, a sleeve geared to the hand of the pointer which indicates the first-named speeds, said sleeve having an enlargement or projection above the toothed portion, centrifugal devices through which said sleeve is given a rotary and a vertical movement, alarm mechanism, electrical connections between said alarm mechanism and said sleeve, and an adjustable contact with which the enlarged portion of said sleeve connects when the maximum speed of the vehicle is attained, and whereby the circuit is closed and the alarm is sounded simultaneously with the indication of maximum speed on the dial, substantially as and for the purposes specified.

3. In an indicating-gage for indicating the speed of a vehicle, the combination of a shaft adapted to rotary motion, means for driving said shaft from a rotating portion of a vehicle, a sleeve loosely connected to said shaft and subjected to a rotary motion therewith, and also to a vertically-reciprocating movement, centrifugal devices connecting said sleeve with the shaft, a series of annular projections on said sleeve, an enlargement on said sleeve above said annular projections, a dial bearing indications denoting the speeds at which the shaft and the sleeve are rotated, and likewise the speed at which the vehicle is driven, a pinion geared to said annular projections, a pointer movable by said pinion to positions to indicate such speeds on the dial, an alarm device adapted to sound an alarm when the speed of the vehicle reaches a prescribed limit, electrical connections between said alarm device and said sleeve, a circuit-closer actuated by the enlarged portion of said sleeve, and whereby the circuit is closed when said sleeve is lowered to a predetermined point and an alarm is sounded, substantially as and for the purposes specified.

In testimony whereof I affix my signature in presence of two witnesses.

HENRY S. CREDLEBAUGH.

Witnesses:
R. J. McCARTY,
FLETCHER BOHLENDER.